March 2, 1971     M. W. LATHERS     3,567,209
VEHICLE BODY

Filed April 16, 1969     2 Sheets-Sheet 1

INVENTOR.
Michael W. Lathers
BY
Herbert Furman
ATTORNEY

March 2, 1971  M. W. LATHERS  3,567,209

VEHICLE BODY

Filed April 16, 1969  2 Sheets-Sheet 2

INVENTOR.
Michael W. Lathers
BY
Herbert Furman
ATTORNEY

United States Patent Office 3,567,209
Patented Mar. 2, 1971

3,567,209
VEHICLE BODY
Michael W. Lathers, Birmingham, Mich., assignor to
General Motors Corporation, Detroit, Mich.
Filed Apr. 16, 1969, Ser. No. 816,719
Int. Cl. B60j 5/10
U.S. Cl. 296—50                                7 Claims

ABSTRACT OF THE DISCLOSURE

A station wagon includes a tailgate window for opening and closing the upper portion of the rear opening and a tailgate for opening and closing the lower portion of the opening. The tailgate is supported by arms extending inwardly of the body and pivoted to the chassis rails for movement about a horizontal axis transverse of the body. When the tailgate moves to open position, it moves between the load floor and the bumper structure. A counterbalance arrangement supports the tailgate in its open position.

---

This invention relates to vehicle bodies and more particularly to a closure arrangement for a vehicle body opening.

The closure arrangement of this invention is particularly adapted for the tailgate opening of a station wagon type of vehicle body. Conventionally such openings are opened and closed by a tailgate and a tailgate window. The tailgate opens and closes the lower half of the opening and the tailgate window is supported by the tailgate for movement into and out of the tailgate to open and close the upper half of the opening. The tailgate may be mounted on the body for outward swinging movement to an open position about a vertically disposed axis adjacent one side thereof, a horizontal axis located transversely of the body and adjacent the lower side of the tailgate, or selectively about either axis. Since the tailgate swings outwardly of the body regardless of the axis of swinging, there is some restriction to the tailgate opening when the tailgate is in an open position.

The closure arrangement of this invention overcomes this disadvantage by providing a tailgate which, in its preferred embodiment, is swingably mounted on the body for movement about a fixed horizontal axis transverse of the body between a closed position wherein the tailgate closes the lower half of the tailgate opening and an open position wherein the tailgate moves through a passageway between the body and an adjacent bumper structure and is located below the general level of the load floor so that complete unrestricted access to the interior of the station wagon or other body may be obtained.

The primary object of this invention is to provide an improved vehicle body closure arrangement wherein a closure for the lower half of a vehicle body opening is swingably mounted on the body for movement about a fixed horizontal axis transverse of the body between a closed position wherein the closure closes the lower half of the opening and an open position wherein the closure moves through a passageway between the body and an adjacent bumper structure to an open position wherein the closure is located below the general level of the load floor to provide unrestricted access through the opening to the interior of the body. Another object of this invention to to provide such a closure arrangement for a station wagon type of vehicle body wherein the major portion of the support arms and counterbalance structure for supporting the tailgate on the body are located to the sides of the opening and the load floor.

These and other objects of this invention will be readily apparent from the following specification and drawings wherein.

Figure 1:
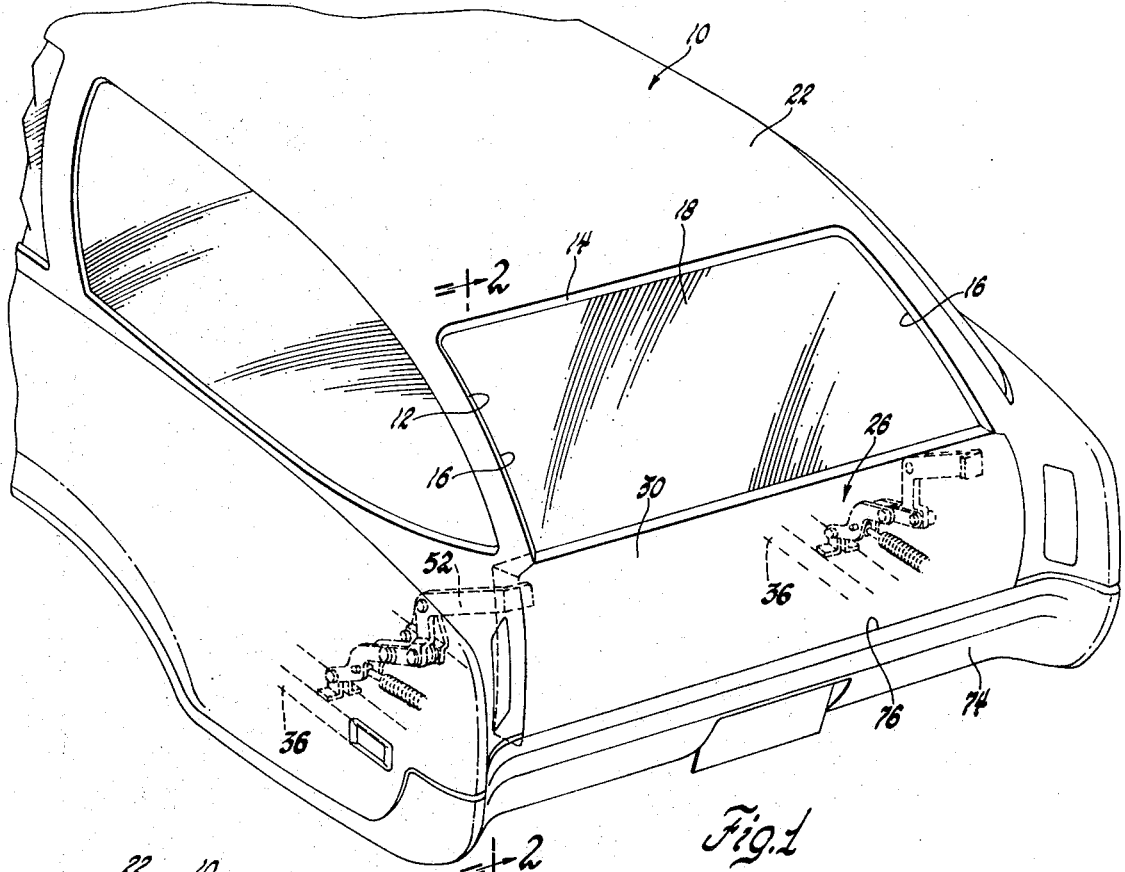
FIG. 1 is a partial perspective view of the rear portion of a station wagon type of body embodying a closure arrangement according to this invention, with the tailgate and window shown in closed position.
Figure 2:
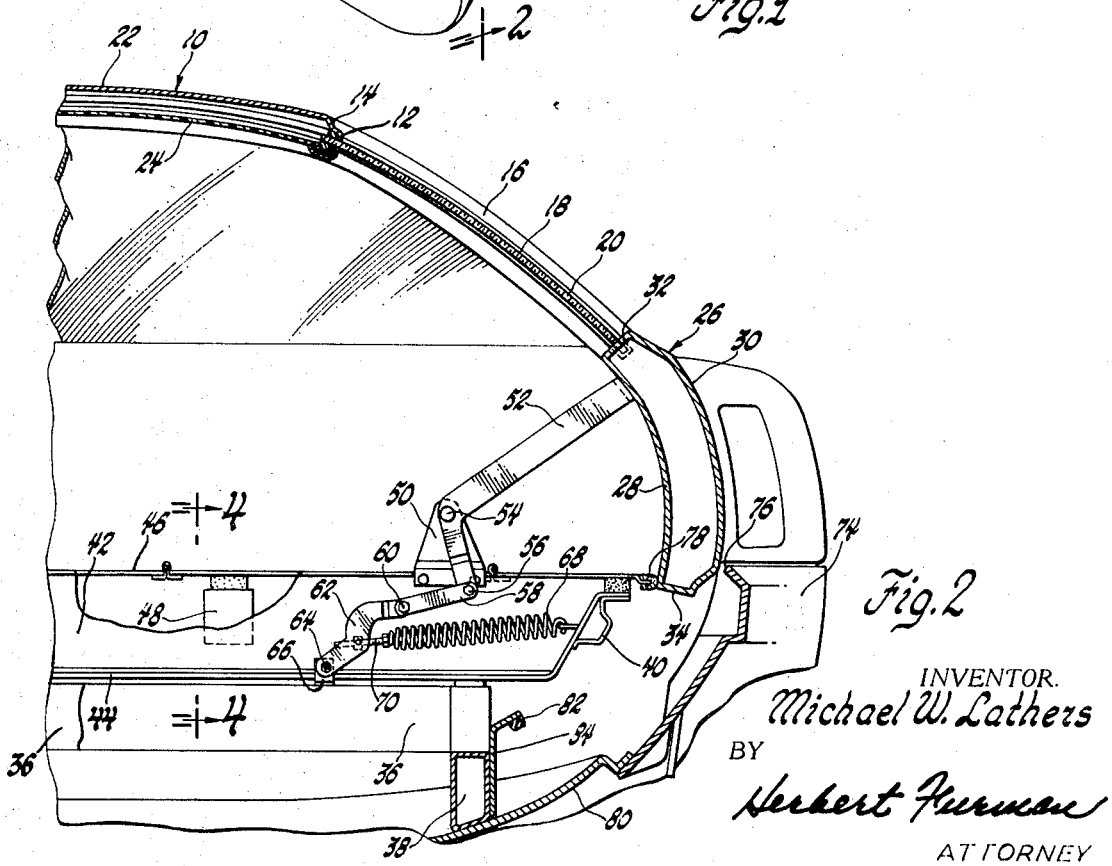
FIG. 2 is a cutaway view of a portion of FIG. 1 taken generally along line 2—2 thereof.
Figure 3:
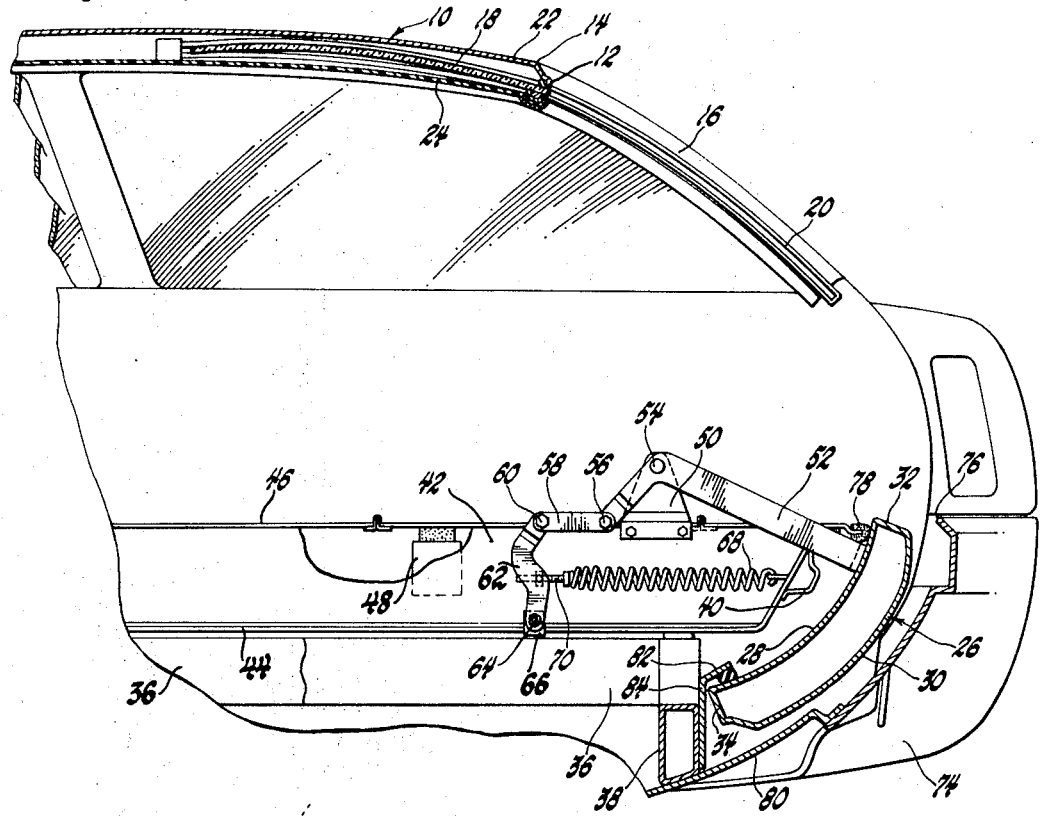
FIG. 3 is a view similar to FIG. 2 showing the tailgate and window in open position.

Referring now particularly to FIG. 1 of the drawings, a station wagon type of vehicle body 10 includes a rear or tailgate opening 12. The upper edge of the opening 12 is defined by the header 14 of the body and the side edges of the opening are defined by body pillar structures 16. The upper half of the opening 12 is opened and closed by a tailgate window 18. In the structure shown, the window 18 is moved from its closed position as shown in FIGS. 1 and 2 to its open position as shown in FIG. 3 along tracks 20 which are secured to the pillar structures 16 and extend upwardly into the roof structure of the body between the roof panel 22 and the headlining 24. The mounting of the window 20 and any operating means for moving the window form no part of this invention and reference may be had to Wozena et al. 3,211,492, assigned to the assignee of this invention, for a showing of such. Also, it is to be understood that the closure arrangement of this invention is not limited to the window 20 moving to an open position within the roof structure of the body since the window 20 may also conventionally move to an open position within the tailgate 26.

The tailgate 26 opens and closes the lower half of the opening 12. Generally the tailgate is a hollow structure including inner and outer panels 28 and 30, respectively, side panels or walls, not shown, and upper and lower panels or walls 32 and 34, respectively. Since the window 18 is moved to an open position within the roof structure of the body, the tailgate 26 can be an extremely light weight structure since it need only support itself.

Figure 4:
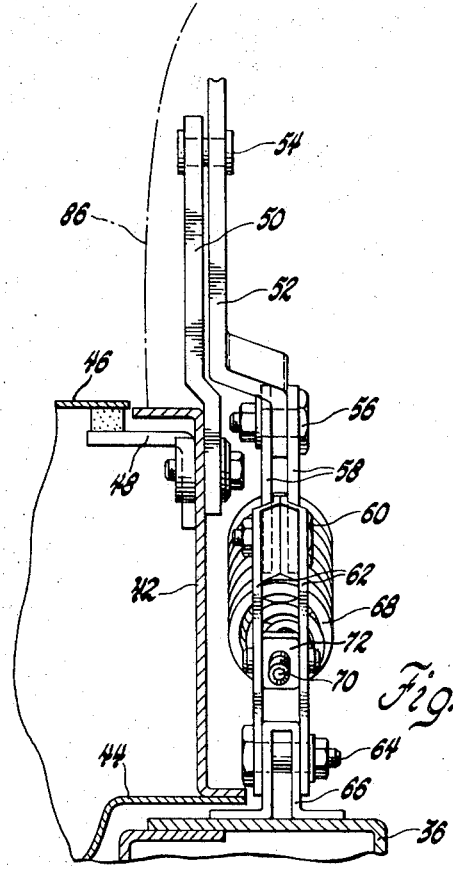
FIG. 4 is an enlarged view taken generally along line 4—4 of FIG. 2.

The chassis frame of the vehicle 10 is generally conventional and includes a laterally spaced generally parallel pair of frame rails 36 which are interconnected adjacent their rearward ends by a lower cross member 38. Body side panel structures 42 extend upwardly from the rails 36 and cooperate with a lower floor pan 44, FIG. 4, in defining a storage area for the body 10. A brace welded to the rear edge portion of pan 44 provides a cross member 40 for the body. This storage area is opened and closed in a conventional manner by a foldable load floor 46. Floor 46, in unfolded position, rests on rubber bumpers on the cross member 40 and on rubber bumpers on brackets 48 secured to structure 42, as shown in FIGS. 2 and 3.

A triangular bracket 50 is bolted to each of the structures 42 and extends upwardly therefrom. A bellcrank 52 is pivoted at 54 to each of the brackets 50. The longer legs of the bellcranks extend rearwardly and have their bent ends conventionally secured to the inner panel 28 of the tailgate 26 adjacent the side panels thereof to pivotally mount the tailgate on the body for swinging movement about the horizontal transverse axis defined by pivots 54. The shorter leg of each bellcrank is pivoted at 56 to tandem links 58, FIG. 4, which in turn are pivoted at 60 to the bent together ends of tandem levers 62. The lower ends of each pair of levers 62 are pivoted at 64 to hat-shaped bracket 66 secured to each of the rails 36. A tension spring 68 extends between the cross member 40 and each of the tandem levers 62, with the rearward end of each spring being hooked in a conventional manner to the cross member and the forward end of each spring being rotatably secured to threaded studs 70 which are threaded through nuts 72 pivoted to the tandem pairs of levers 62. Upon rotation of the studs 70, the tension of the springs is adjusted.

The body 10 also includes a rear bumper structure 74 which is located generally outwardly of the body and opening 12 and is conventionally mounted on the frame rails 36. The bumper structure 74 and the load floor 46 define a passageway 76 which is generally of the width of the opening 12 between pillar structures 16 and communicates therewith. The passageway is of the smallest possible depth measured longitudinally of the body. A sealing strip or other sealing means 78 is mounted on the load floor 44 to seal against the inner panel 28 of the tailgate when the tailgate is in a closed position and prevent ambient matter from entering the interior of the body.

When the tailgate 26 is in a closed position as shown in FIGS. 1 and 2, it cooperates with the window 18 in closing the opening 12. When it is desired to open the opening, the window 18 is moved to its open position and thereafter the tailgate 26 is manually moved downwardly of the body from its closed position shown in FIGS. 1 and 2 to its open position shown in FIG. 3. During such movement, the arms 52 swing clockwise about the pivots 54 and the links 58 swing the levers 62 counterclockwise about pivots 64 against the tension of the springs 68 as the tailgate moves into the passageway 76 toward open position. As the tailgate 26 moves to open position, the pivots 56 and 60 of the links 58 come into alignment with the line of force of the spring 68, as shown in FIG. 3, to thereby retain the tailgate 26 in open position. Although the movement of the tailgate to open position is against the action of the springs 68, it is much easier for the operator to move the tailgate downwardly against the springs than to have to pull it upwardly against the action of the springs. It is believed clear that the tailgate can be easily moved from its open position of FIG. 3 to its closed position of FIGS. 1 and 2 by merely slightly pulling upwardly to displace the pivots 56 so that the pivots 56 and 60 move out of parallelism with the lines of action of the springs 68.

When the tailgate is in open position, it does not in any manner hinder access to the interior of the body through opening 12 since it is disposed below the general level of the load floor 46.

If desired, some type of cover plate 80 may be provided between the bumper structure 74 and the cross member 38 to protect the tailgate in open position. Also various resilient stops, such as stops 82, mounted on brackets 84 supported by the cross member 38, may be provided to resiliently locate the tailgate 26 in its open position. Various conventional locks or catches may also be provided to additionally maintain the tailgate in open position. Although a manually movable tailgate has been shown and described, it is believed clear that the tailgate 26 could be conventionally power operated for movement between its open and closed positions.

Conventionally tailgates include bolsters or trim structures which are located on the interior of the sides of the body to conceal the various structural members of the body. Such a bolster has been shown in phantom at 86 in FIG. 4. The bolster, of course, would have to have a vertical slit adjacent its rearward end to permit swinging movement of the longer arms of the bellcranks 52 therethrough and these arms might have to be offset.

Thus, this invention provides an improved closure arrangement for vehicle bodies.

I claim:

1. In combination with a station wagon vehicle body having an opening therein, window means for opening and closing the upper portion of the opening, and body floor structure located inwardly of the opening and terminating adjacent the lower half of the opening, a closure arrangement comprising, in combination, a bumper structure spaced outwardly of the body adjacent the lower portion of the opening, the space between the bumper structure and the body communicating with the lower portion of the opening, a closure for opening and closing the lower portion of the opening, closure guide means on the body adjacent each side of the opening defining a fixed arcuate path of movement generally following the contour of the lower portion of the opening, and means mounting the closure on the guide means for movement along the fixed arcuate path within the general contour of the lower portion of the opening between a closed position wherein the closure closes the lower portion of the opening and an open position wherein the closure moves through the space between the bumper structure and the body and is located generally below the body floor structure to provide unrestricted access to the interior of the body through the opening therein.

2. The combination recited in claim 1 wherein the body includes a cross member located adjacent and inwardly of the opening, the closure moving between the cross member and the bumper structure.

3. The combination recited in claim 1 wherein the body includes a cross member, the chassis frame for the body includes a pair of spaced apart side rails joined adjacent their ends by a cross member lower than the body cross member, the upper cross member being located inwardly of the opening in spaced relationship to the bumper structure and the lower cross member being located below and to one side of the upper cross member, the tailgate being located adjacent the upper and lower cross members in open position.

4. In combination with a station wagon vehicle body having an opening therein, window means for opening and closing the upper portion of the opening, and body floor structure located inwardly of the opening and terminating adjacent the lower half of the opening, a closure arrangement comprising, in combination, a bumper structure spaced outwardly of the body adjacent the lower portion of the opening, the space between the bumper structure and the body communicating with the lower portion of the opening, a closure for opening and closing the lower portion of the opening, means on the body mounting the closure on the body for movement along a fixed arcuate path within the general contour of the lower portion of the opening between a closed position wherein the closure closes the lower portion of the opening and an open position wherein the closure moves through the space between the bumper structure and the body and is located generally below the body floor structure to provide unrestricted access to the interior of the body through the opening therein, said means including at least one arm secured to the closure adjacent one side thereof and movable about a horizontal pivot axis located inwardly of the opening and generally transverse of the body.

5. The combination recited in claim 4 including counterbalance means operatively connected between the arm and the body for counterbalancing the weight of the closure during movement of the closure from an open position to a closed position.

6. The combination recited in claim 4 wherein the body includes a cross member located inwardly of the bumper structure, the upper portion of the tailgate being located between the bumper structure and the cross member in open position, and means extending from the bumper structure for protecting the lower portion of the tailgate in open position.

7. In combination with a station wagon vehicle body having a rear opening therein, window means for opening and closing the upper portion of the opening, a cross member located inwardly of the opening, and body floor structure located inwardly of the opening and terminating adjacent the lower half of the opening, a closure arrangement comprising, in combination, a bumper structure spaced outwardly of the cross member adjacent the lower portion of the opening, the space between the bumper structure and the cross member communicating with the lower portion of the opening, a closure of the general size of the lower portion of the opening, means on the body mounting the closure on the body for movement along a fixed arcuate path within the general contour of the lower portion of the opening between a closed position wherein the closure closes the lower portion of the opening and an open position wherein the closure moves through the space between the bumper structure and the cross member and is located generally below the body floor structure to provide unrestricted access to the interior of the body through the opening therein, and means counterbalancing the closure during movement between open and closed positions.

References Cited

UNITED STATES PATENTS

| | | | |
|---|---|---|---|
| 770,572 | 9/1904 | Gnatzig | 296—57 |
| 1,264,804 | 4/1918 | Jacobs | 49—40(X) |
| 1,940,444 | 12/1933 | Burgman | 49—40(X) |
| 2,651,541 | 9/1953 | Surles | 296—155 |
| 3,010,760 | 11/1961 | Trautmann | 296—57 |
| 3,169,282 | 2/1965 | Godwin | 49—40 |

LEO FRIAGLIA, Primary Examiner

L. J. PAPERNER, Assistant Examiner

U.S. Cl. X.R.

49—40, 350, 372; 296—106, 149